(12) United States Patent
Chang et al.

(10) Patent No.: US 6,829,479 B1
(45) Date of Patent: Dec. 7, 2004

(54) FIXED WIRELESS BACK HAUL FOR MOBILE COMMUNICATIONS USING STRATOSPHERIC PLATFORMS

(75) Inventors: Donald C. D. Chang, Thousand Oaks, CA (US); Ming U. Chang, Rancho Palos Verdes, CA (US); Ying Feria, Manhatten Beach, CA (US); Harold Rosen, Santa Monica, CA (US)

(73) Assignee: The DirecTV Group. Inc., El Segundo, CA (US)

( * ) Notice: Subject to any disclaimer, the term of this patent is extended or adjusted under 35 U.S.C. 154(b) by 559 days.

(21) Appl. No.: 09/615,894

(22) Filed: Jul. 14, 2000

(51) Int. Cl.$^7$ .................................................. H04Q 7/20
(52) U.S. Cl. ........................ 455/431; 455/446; 455/13.1; 455/11.1
(58) Field of Search ................................ 455/431, 430, 455/13.1, 449, 63.2, 11.1, 427, 446, 428, 429

(56) References Cited

U.S. PATENT DOCUMENTS

| | | |
|---|---|---|
| 5,109,390 A | 4/1992 | Gilhousen et al. |
| 5,339,330 A | 8/1994 | Mallinckrodt |
| 5,555,444 A | 9/1996 | Diekelman et al. |
| 5,589,834 A | 12/1996 | Weinberg |
| 5,594,941 A | 1/1997 | Dent |
| 5,608,722 A | 3/1997 | Miller |
| 5,612,701 A | 3/1997 | Diekelman |
| 5,715,516 A | 2/1998 | Howard et al. |
| 5,717,737 A | 2/1998 | Doviak et al. |
| 5,790,070 A | 8/1998 | Natarajan et al. |
| 5,852,721 A | 12/1998 | Dillon et al. |
| 5,862,480 A | 1/1999 | Wild et al. |
| 5,864,579 A | 1/1999 | Briskman |
| 5,867,109 A | 2/1999 | Wiedeman |
| 5,915,207 A | 6/1999 | Dao et al. |

(List continued on next page.)

FOREIGN PATENT DOCUMENTS

| | | |
|---|---|---|
| EP | 1 139 583 A2 | 10/2001 |
| EP | 1 148 662 A2 | 10/2001 |
| EP | 1 152 552 A2 | 11/2001 |
| EP | 1 158 698 A2 | 11/2001 |
| WO | WO 95/04407 | 2/1995 |
| WO | WO 96/22661 | 7/1996 |
| WO | WO 97/07609 | 2/1997 |
| WO | WO98/51568 | 11/1998 |
| WO | WO 99/13598 | 3/1999 |
| WO | WO 99/23769 | 5/1999 |
| WO | WO 00/14902 A2 | 3/2000 |
| WO | WO 01/93458 A2 | 12/2001 |
| WO | WO 01/95523 A3 | 12/2001 |

OTHER PUBLICATIONS

Colella, Nicholas, "HALO Network—The Birth of Stratospheric Communications Services & Decline of Satellite Networks", http://www.angelhalo.com/techpaper6, Copyright 1997–1999.

(List continued on next page.)

*Primary Examiner*—Edward F. Urban
*Assistant Examiner*—Lana Le
(74) *Attorney, Agent, or Firm*—Georgann S. Grunebach; John A. Crook, III

(57) ABSTRACT

A method and system for communicating includes a plurality of cells having base units therein. Each of the base units communicates with a plurality of users within the cells. A communications platform is located in a stratospheric location for transmitting and receiving information with respect to the base units. A gateway station communicates with the communications platform and routes signals to terrestrial networks or other user back through the communications platform. A microcell within at least one of the cells is used to provide coverage in a small geographic area such as within a building. Each of the microcells is also in communication with the gateway station through the platform.

13 Claims, 1 Drawing Sheet

U.S. PATENT DOCUMENTS

| | | | |
|---|---|---|---|
| 5,918,157 A | | 6/1999 | Wiedeman et al. |
| 5,937,332 A | | 8/1999 | Karabinis |
| 5,946,625 A | | 8/1999 | Hassan et al. |
| 5,963,862 A | | 10/1999 | Adiwoso et al. |
| 5,974,317 A | | 10/1999 | Djuknic et al. |
| 5,982,337 A | | 11/1999 | Newman et al. |
| 5,995,725 A | | 11/1999 | Dillon |
| 5,995,726 A | | 11/1999 | Dillon |
| 6,016,388 A | | 1/2000 | Dillon |
| 6,028,884 A | | 2/2000 | Silberger et al. |
| 6,061,562 A | * | 5/2000 | Martin et al. ............... 455/431 |
| 6,067,453 A | | 5/2000 | Adiwoso et al. |
| 6,104,911 A | | 8/2000 | Diekelman |
| 6,160,994 A | | 12/2000 | Wiedeman |
| 6,167,263 A | | 12/2000 | Campbell |
| 6,195,555 B1 | | 2/2001 | Dent |
| 6,201,797 B1 | | 3/2001 | Leuca et al. |
| 6,205,320 B1 | | 3/2001 | Coleman |
| 6,215,776 B1 | | 4/2001 | Chao |
| 6,298,238 B1 | | 10/2001 | Dai |
| 6,308,045 B1 | * | 10/2001 | Wright et al. ............... 455/431 |
| 6,324,398 B1 | | 11/2001 | Lanzerotti et al. |
| 6,324,405 B1 | | 11/2001 | Young et al. |
| 6,343,205 B1 | | 1/2002 | Threadgill et al. |
| 6,374,080 B2 | | 4/2002 | Uchida |
| 6,377,802 B1 | | 4/2002 | McKenna et al. |
| 6,385,434 B1 | | 5/2002 | Chuprun et al. |
| 6,388,615 B1 | | 5/2002 | Chang et al. |
| 6,408,180 B1 | * | 6/2002 | McKenna et al. .......... 455/431 |
| 6,422,516 B1 | | 7/2002 | Maeda et al. |
| 6,438,379 B1 | * | 8/2002 | Gitlin et al. ................ 455/449 |
| 6,452,541 B1 | | 9/2002 | Zhao et al. |
| 6,466,554 B2 | | 10/2002 | Okada |
| 6,507,739 B1 | * | 1/2003 | Gross et al. ................ 455/431 |
| 6,526,288 B1 | | 2/2003 | Khalifa et al. |
| 6,529,706 B1 | | 3/2003 | Mitchell |
| 6,567,052 B1 | | 5/2003 | Wang et al. |
| 6,570,858 B1 | | 5/2003 | Emmons, Jr. et al. |
| 6,591,111 B1 | | 7/2003 | Stosz et al. |
| 2002/0041575 A1 | | 4/2002 | Karabinis et al. |
| 2002/0072361 A1 | | 6/2002 | Knoblach et al. |
| 2002/0126042 A1 | | 9/2002 | Chang et al. |

OTHER PUBLICATIONS

Djuknic, Goran et al., "Establishing Wireless Communications Services via High—Aeronautical platforms: A Concept Whose Time Has Come?" IEEE Communications Magazine, Sep. 1997, pp. 128–135.

Martin, James N. et al., "Halo Network—The Cone of Commerce", http://www.angelhalo.com/techpaper2, copyright 1997–1998.

Martin, James N. et al., "HALO Network—Broadband Wireless Services from High Altitude Long Operation (HALO) Aircraft", http://www.angelhalo.com/techpaper2, copyright 1997–1998.

Akyildiz, Ian F. et al., "HALO (High Altitude Long Operation): A Broadband Wireless Metropolitan Area Network", IEEE International Workshop on Mobile Multimedia Communications, Nov. 1999, pp/. 271–275.

Divsalar et al., "Trellis Coded MPSK Modulation Techniques for MSAT-X", Proceedings of the Mobile Satellite Conference, May 3–5, 1988, NASA, JPL Publication 988–9, pp. 283–290.

Agnew et al., "The AMSC Mobile Satellite System", Proceedings of the Mobile Satellite Conference, May 3–5, 1988, NASA, JPL Publication 988–9, pp. 3–9.

D. Ayyagiri et al., "Blocking Analysis and Simulation Studies in Satellite–Augmented Cellular Networks", IEEE, 1996, pp. 437–441.

Peter Poskett, "The ICO System For Personal Communications By Satellite", The Institution of Electrical Engineers, Published by the IEE, Savoy Place, London, 1998, pp. 2.1–2/6.

Colella, Nicholas J. et al., "The HALO Network™", IEEE Communications Magazine, Jun. 2000, pp. 142–148.

Colella, Nicholas J. et al., "High Speed Internet Access via Stratospheric HALO Aircraft", INET 99 Proceedings, Internet Society, Technology, Wireless, 13 pages, Jun. 8, 1999.

Casewell I.E. , "provision of GSM cellular radio environment within passenger aircraft operating over Europe", Racal Res. Ltd., Walton–on–Thames, Mobile Radio and Personal Communications, 1989, Fifth International Conference, Dec. 11, 1989–Dec. 14, 1989, pp. 172–176.

* cited by examiner

FIXED WIRELESS BACK HAUL FOR MOBILE COMMUNICATIONS USING STRATOSPHERIC PLATFORMS

TECHNICAL FIELD

The present invention relates generally to wireless communications and, more particularly, to a wireless communications system that uses a high altitude communication device.

BACKGROUND ART

In this communication age, content providers are increasingly investigating ways in which to provide more content to users as well as interfacing with a larger group of users. The latest communications systems use digital broadcast satellites to broadcast to users in a forward direction. System operators have recognized that user requests are relatively small in terms of data compared to the amount of data broadcast from the satellite. Thus, for example, in the DirecTV® system, user requests are transmitted through telephone lines and programming is provided to the users via satellite.

In addition to satellites, stratospheric platforms are currently under development. One such stratospheric platform is Helios that is being developed by AeroVironment. The Helios stratospheric platform is an unmanned vehicle that can fly for several months at a height of about 60,000 feet. Helios is a solar powered electric plane that is modular in design and may be configured to carry a variety of payloads. Stratospheric platforms have numerous advantages including that capacity can be concentrated over a populated area, transmission delays associated with geostationary satellites are significantly reduced, the power required for transmitting and receiving is substantially smaller than satellites, and the elevation angles of the system are high. Also, these stratospheric platforms can be deployed relatively rapidly compared to satellites and thus, if a need increases, the system capability may be increased. In terrestrial-based cellular phone systems, a plurality of base stations are used to communicate with terrestrial-based users. The base stations require either terrestrial microwave links or fiber links that communicate with a central switching location. The growth of mobile communication systems is ever increasing. However, to keep up with demand, new cell sites must be added particularly in urban areas. However, it is increasingly difficult to add new cell sites in urban areas.

It would therefore be desirable to provide a wireless communication that allows easy expansion services to new users and the capability of adding additional capacity in high usage areas.

SUMMARY OF THE INVENTION

It is therefore one object of the present invention to provide a terrestrial wireless network that is easily expandable.

In one aspect of the invention, a communications system comprising a plurality of cells having a base unit therein. Each of the base units communicates with a plurality of users. A communication platform located in a stratospheric location is used for transmitting and receiving information from the base units. A gateway communicates with the platform and couples the user terminals with a terrestrial-based network through the communications platform and the base units.

In a further aspect of the invention, a method of operating a communications system comprises the steps of:

sending first communication signal from a first user terminal to a base unit;

sending the first signal from the base unit to a stratosphere-based communications platform;

transmitting the first signal from the stratosphere-based communications platform to a gateway ground station In a further aspect of the invention, the gateway may transmit the first signal from the gateway ground station to a terrestrial-based network or the first signal may be transmitted back to the stratosphere platform and routed to another terminal through the same or a different base unit.

One advantage of the invention is that high-speed access to the Internet or other terrestrial networks may be obtained. Another advantage of the invention is that a wireless system may be expanded rapidly without having to provide a fixed communication between a gateway center and any additional cell sites.

Other objects and features of the present invention will become apparent when viewed in light of the detailed description of the preferred embodiment when taken in conjunction with the attached drawings and appended claims.

BEST MODES FOR CARRYING OUT THE INVENTION

Figure 1:
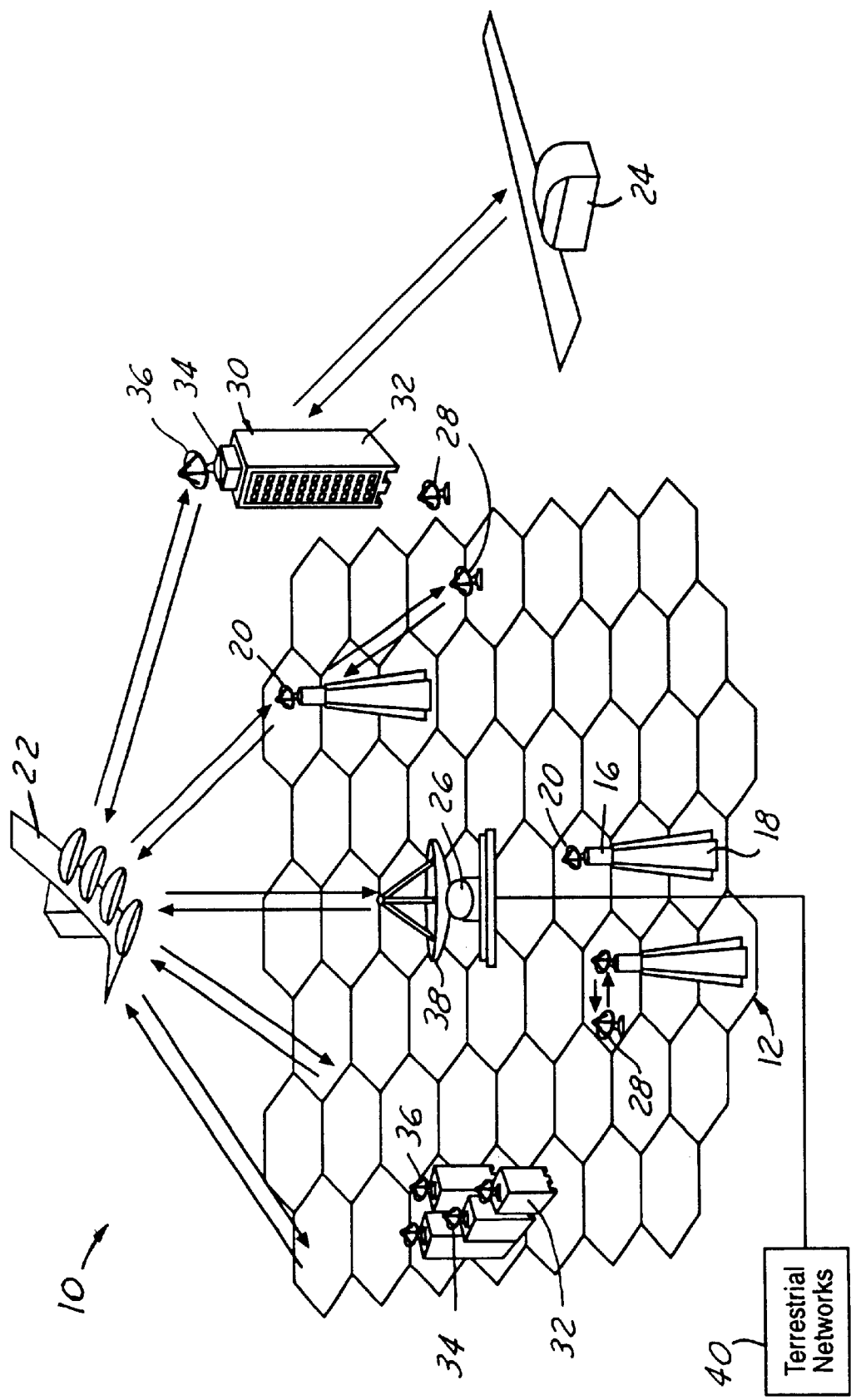
FIG. 1 is a system diagrammatic view of the communication system according to the present invention.

In the following description, those skilled in the art would recognize that other embodiments and structural changes may be made without departing from the scope of the invention.

Referring now to the figure, a communications system 10 has a cellular pattern 12 that is illustrated as a plurality of hexagons on the earth's surface. The hexagons represent cells 14. Each cell 14 represents a geographic area that can receive a signal with a predetermined signal strength from a base unit 16 of a cellular tower 18. Each base unit 16 has a transmitting and receiving antenna 20 positioned thereon for transmitting and receiving signals from a platform 22. Although each cell 14 is illustrated as a hexagon, the edges of the cells are not physical boundaries and may vary depending on the positions and strength of the signals from cellular tower 18.

Platform 22 communicates with each base unit 16, a platform operations center 24, and a gateway station 26. Each communication link between platform 22 and base unit 16, platform 22 and gateway station 26, platform 22 and platform operations center 24, and user terminals 28 and base unit 16 is described below.

A plurality of microcells 30 may also be established within various locations of the cellular pattern 12. As illustrated, building 32 may contain a microcell 30 therein. Microcell 30 may have a microcell base unit 34 that has an antenna 36 for communicating with platform 22. The microcell base unit 34 may also have an antenna that is used to transmit and receive wireless information from within building 32. A plurality of microcells 30 may be established in various locations throughout the cellular pattern 12 and more particularly within various buildings within the cellular pattern 12. Microcell 30 acts as an additional sub-cell within a cell.

Platform 22 is preferably a stratosphere-based platform that remains substantially stationary relative to a geographic region on the earth. The platform 22 is controlled by platform operations center 24 to fly in a small radius flight path over a given spot on the earth. Various numbers of platforms may be used to cover a predetermined geographic region. Each platform 22 is used as a communications node between gateway station 26 and base units 16,34. The base units 16,34 have their respective antennas 20,36 pointed toward the location of platform 22. Gateway station 26 has an antenna 38 pointed toward platform 22. Preferably, the beam width of the antennas is wide enough to maintain communications link with platform 22 throughout the flight path 22. Gateway 26 is coupled to various terrestrial networks 40 such as a public service telephone network or various Internet providers. User terminals 28 have access to terrestrial networks 40 through base units 16,34 and platform 22.

Platform operations center 24 acts as a control station for platform 22 and other platforms throughout system 10. Platform operations center 24 provides control functions, such as attitude control, attitude management and replacement of parts and/or platforms 22 throughout system 10. Platform operations center 24 determines when and if a specific platform 22 needs repair, replacement, or maintenance functions performed by monitoring the status of one or more platforms 22 in system 10.

The antennas used by platform 22, base units 16,34 and gateway 26 allow for large data throughput in the present invention. Since there is shorter physical distance between the user terminals 28 and the terrestrial networks 40 than in satellite-based systems, larger amounts of data at a larger data rate may be provided.

The communications payload on platform 22 may, for example, be a simple transponder design connecting the base units 16,34 to gateway station 26. Various types of encoding schemes may be incorporated such as code division multiple access (CDMA), time division multiple access (TDMA), frequency division multiple access (FDMA), or combinations of these schemes to overcome interference caused by the worst case platform motions. Various frequencies may be used depending on the system requirements for communication between user terminals and base unit 16,34, between base unit 16 and platform 22, and, between platform 22 and gateway station 26. The base units 34 of microcells 30 preferably transmit at a frequency that does not interfere or otherwise block signals from within the cell 14 that it transmits. Also, microcell base unit 34 may transmit at a lower power than base unit 16 of cells 14. This allows the signals of the microcell base units 34 to be directed into a narrow region such as a building.

In operation, signals from user terminals 28 are transmitted to base unit 16. The base unit 16 transmits the signal to platform 22. Platform 22 transmits the signal to gateway station 26. Gateway 26 receives the signal and determines whether the signal is an in-network signal or whether the signal is outside of the network. If the signal is within the network, the gateway station transmits the signal back to the platform 22. The platform 22 routes the signal to the appropriate base unit 16 which in turn transmits a signal to the appropriate user terminal to which the call should be routed. If the signal is an out-of-network signal, the gateway station 26 routes the signal to the terrestrial networks 40.

The microcells 30 work in a similar manner to that with respect to cells 14. That is, the user terminals within the microcells such as building 32 transmit signals to a microcell base unit 34. The microcell base unit 34 transmits the signal to the platform 22. The rest of the operation is the same as that described above.

The present invention advantageously allows the wireless services to be expanded rapidly without having to provide fixed connection between the base unit 16,34 and the gateway station 26. This link is often referred to as a "back haul." Also, the total system capacity is scalable by increasing the number of platforms associated with the system. Thus, large geographic areas may be covered with several platforms and several gateway stations.

While particular embodiments of the invention have been shown and described, numerous variations alternate embodiments will occur to those skilled in the art. Accordingly, it is intended that the invention be limited only in terms of the appended claims.

What is claimed is:

1. A communications system comprising:
    a plurality of cells having a base unit therein, each base unit communicating with a plurality of users;
    a communications platform located in a stratospheric location for transmitting information signals to and receiving information signals from said base unit:
    a gateway station communicating with the communications platform for coupling the user terminal with a terrestrial-based network through the communications platform and the base unit; and
    a microcell within one of the plurality of cells, wherein said microcell comprises a microcell base unit coupled to said communications platform.

2. A communications system as recited in claim 1 wherein said users are mobile.

3. A communication system as recited in claim 1 wherein the microcell is formed within a building.

4. A communications system as recited in claim 1 wherein said microcell base unit communicates with said platform in a non-blocking manner with respect to at least one of said plurality of cells.

5. A communications system as recited in claim 1 wherein the communications platform is substantially stationary in the stratospheric location.

6. A communications system as recited in claim 1 wherein said system comprises a plurality of communications platforms.

7. A communications system comprising:
    a plurality of cells having a base unit therein, each base unit communicating with a plurality of users;

at least one of the cells comprising a microcell having a microcell base unit therein, each microcell base unit communicating with a plurality of microcell users within the microcell;

a communications platform located in a stratospheric location for transmitting and receiving information with respect to said microcell base units and said base units; and a gateway station communicating with the communications platform for coupling the microcell user terminals through the microcell base unit and the communications platform, and for coupling the user terminals through the base units and the communications platform.

8. A communications system as recited in claim 7 further comprising a platform operations center for controlling the operation of the platform.

9. A communications system as recited in claim 7 wherein said users are mobile users.

10. A communications system as recited in claim 7 wherein the microcell is formed within a building.

11. A communications system as recited in claim 7 wherein said microcell base unit communicates with said platform in a non-blocking manner with respect to at least one of said plurality of cells.

12. A communications system as recited in claim 7 wherein the communications platform is substantially stationary in the stratospheric location.

13. A communications system as recited in claim 7 wherein said system comprises a plurality of communications platforms.

* * * * *